United States Patent [19]
Rontome

[11] Patent Number: 5,222,522
[45] Date of Patent: Jun. 29, 1993

[54] ELASTIC VALVE FOR CONTROLLING A FLUID FLOW

[75] Inventor: Don C. P. Rontome, Madrid, Spain
[73] Assignee: Dirygesa, S.A., Madrid, Spain
[21] Appl. No.: 704,340
[22] Filed: May 23, 1991
[30] Foreign Application Priority Data
May 24, 1990 [ES] Spain ........................... 9001447
[51] Int. Cl.$^5$ .............................. F16K 15/14
[52] U.S. Cl. ........................ 137/845; 206/5.1
[58] Field of Search ................ 137/844, 845; 206/5.1
[56] References Cited

U.S. PATENT DOCUMENTS

| | | | |
|---|---|---|---|
| 2,516,084 | 7/1950 | Wells | 137/845 X |
| 2,941,544 | 6/1960 | Peras | 137/844 |
| 4,889,693 | 12/1989 | Su | 206/5.1 X |

FOREIGN PATENT DOCUMENTS 393956 11/1965 Switzerland ................. 137/844

*Primary Examiner*—Robert G. Nilson
*Attorney, Agent, or Firm*—Collard & Roe

[57] ABSTRACT

An elastic valve for controlling a fluid flow including a valve body with a perforation. The body is made of an elastic material, such as silicon or a similar substance. The perforation normally remains closed but can be opened when the differential pressure reaches a predetermined value. The body can be provided with a flange which facilitates the handling and placement of the valve in the corresponding valve socket. The valve is especially useful for contact lens containers where the valve releases gasses from the container which are created during the disinfecting process.

6 Claims, 1 Drawing Sheet

ELASTIC VALVE FOR CONTROLLING A FLUID FLOW

BACKGROUND OF THE INVENTION

1. Field of the Invention

The present invention refers to an elastic safety valve for escape of fluids, which has been specially designed so that it opens when the differential pressure reaches a determined threshold value, allowing the fluid causing this pressure to escape, and closes hermetically when the differential pressure drops below the opening threshold.

2. The Prior Art

Safety valves and pressure-relief valves are known and constitute complex, generally bulky mechanisms for various applications. Also, valves for releasing excess pressure in contact lens containers are known. When hydrogen peroxide is used for disinfecting contact lenses, excess pressure is created. Some of the known valves consist of a small capillary in the wall of the lid that permits gasses to escape, reducing excess pressure. Due to the small caliber of the opening, liquid cannot spill out. The surface tension of the liquid is sufficient to close the capillary opening. However, liquid can escape if the container is shaken. Small increases in pressure produced by a rise in the temperature of the container when carried in a pocket, as is frequently done, may produce small bothersome spills. Moreover, an obstruction of the capillary orifice may cause the container to explode if the contact lenses are disinfected with a 10% solution by volume of hydrogen peroxide.

Other valves have an orifice filled with a water-proof fibrous material. This material forms a dense filter that allows gas to escape but prevents the passage of liquids. Liquids, especially aqueous solutions, create a surface tension due to the water-proof nature of the fibers. These valves, though they initially work well, are fairly sensitive to obstructions and are relatively expensive to make.

Moreover, valves which distribute fluids through branched duct systems are known. These valves are used for machine lubrication or drip-irrigation systems. They consist of strangulation nozzles on the ends of ducts, which are made of rigid material and have a fixed outlet aperture. These valves have the same disadvantage of being easily obstructed by solid residue which may cause a dangerous increase in pressure in the corresponding duct.

SUMMARY OF THE INVENTION

It is therefore an object of the present invention to eliminate the aforementioned drawbacks of the prior art and to provide a pressure relief valve which is of simple construction.

It is a further object of the present invention to provide such a device which opens at a pre-determined differential pressure value and hermetically seals upon pressure release.

These and other related objects are attained according to the invention by an elastic valve which has been specially designed so that it opens when the differential pressure reaches a pre-determined value. Once the pressure drops below the pre-determined value, the valve closes hermetically.

The elastic valve is of simple construction utilizing elastic material, with a transient perforation. It is constructed of material capable of regulating both the escape of gasses in contact lens containers as well as liquids in various ducts. The risk of excess pressure is avoided, due to the moderate opening pressure which is required.

More specifically, the valve consists of a disk of elastic material with a transient perforation. The transient perforation can be elastically opened by any fluid, when a pre-determined differential pressure is reached. The predetermined pressure is determined according to the dimensions and elasticity of the material of the valve. Therefore, so long as the differential pressure remains below the threshold valve-opening pressure the valve remains closed.

The valve can be utilized in a contact lens container in which the disinfecting process produces gasses that must be released. While the gas is being produced, the pressure of the gas causes the orifice of the valve to open, permitting the gas to escape. When the pressure drops, e.g., because the gas is no longer being produced, the orifice closes again, creating a hermetic seal. Thus, liquid contained in the lens carrier cannot escape by turning the lens carrier upside down or by shaking it. Moreover, since the opening and closing of the valve is caused by very small differences in pressure, the system is totally secure while preventing excess pressure from building up. Such excess pressure may result from an increase in temperature or due to an obstruction. In such a case, an increase in pressure will open the outlet of the valve, i.e., dilate the valve, until the obstruction is eliminated. In an extreme case, the valve may be expelled from its socket; thus, the container is prevented from exploding due to excess pressure.

The elastic valve of the invention can also be utilized in fluid-distribution ducts. The valve is particularly suited to branched ducts of different lengths and/or diameter, since placing these valves at the ends of the ducts prevents free escape of the fluid. Thus, the valve guarantees the existence of pressure throughout the ducts, which is greater than the pressure losses that occur due to fluid circulation. In this way, the pressure at one valve is substantially similar to the pressure at every other valve. Outflow through each of the various ducts is also substantially equal to that at every other duct.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
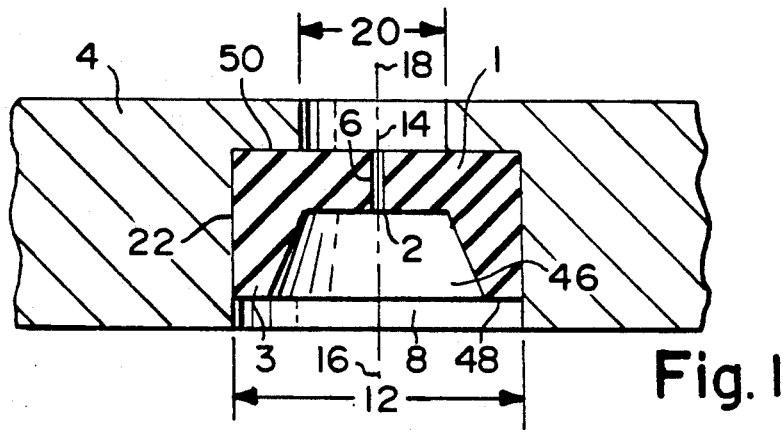
FIG. 1 is a cross-sectional view of a first embodiment of an elastic valve of the present invention.

Referring now in detail to the drawing, and in particular FIGS. 1–4, there is shown a valve with a disk-shaped body 1 made with an elastic material, for example, virgin gum, silicon elastomers or synthetic elastomers, such as PVC, or polyethylene, in which a transient perforation or orifice 2 has been made. Disk 1 extends to form a flange 3 arranged so as to facilitate the handling and placement of the elastic valve. Flanges 3 are particularly useful when the valve is small in size. Such small valves would be applicable to contact lens containers.

Figure 2:
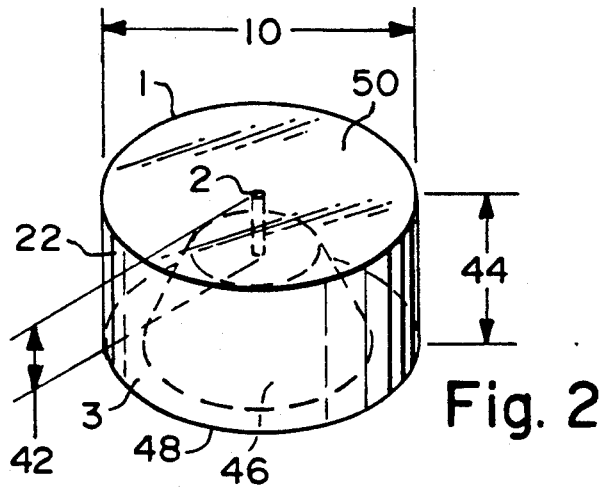
FIG. 2 is a perspective view of the valve of FIG. 1.
Figure 3:
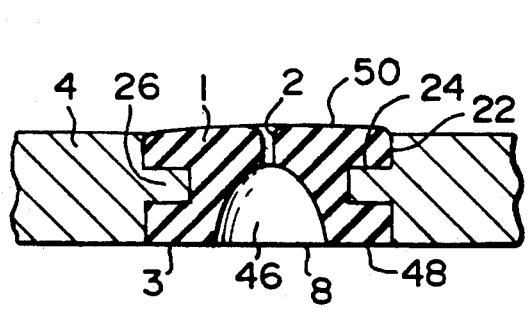
FIG. 3 is a cross-sectional view of a second embodiment of the elastic valve.
Figure 4:
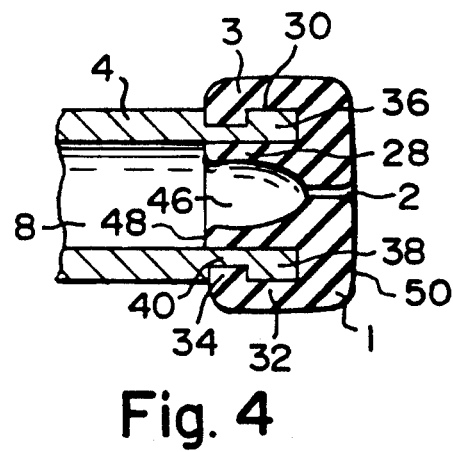
FIG. 4 is a cross-sectional view of a third embodiment of the elastic valve.

Thus, FIGS. 1 and 2 show one embodiment with a simple perimeter flange 3. FIGS. 3 and 4 show two more embodiments where the flanges 3 comprise a clamp means that attaches to the wall of the corresponding duct or socket wall 4.

Orifice 2 of the valve can have various shapes, for example, circular, polygonal, star-shaped, obtained by stamping or molding. Preferably, the valve is molded so that the elastic material of the valve is compressed in socket wall 4 whereby the orifice remains closed so long as the fluid pressure does not exceed a certain threshold pressure value. On the other hand, perforation 2 may also be made by punching or shearing, without extraction of material. In such case, the walls of orifice 2 remain in mutual contact, closing the valve, with no need to compress the material of the valve.

The structure just described provides an elastic valve which operates simply and effectively. For example, as shown in FIGS. 1 and 3, the valve may be placed into the lid of a contact lens carrying case, corresponding to container or socket wall 4. The orifice 2 in disk 1 remains closed, and the sides 6 of the perforation of the disk remain in mutual contact as long as no excess pressure builds up inside the fluid container. When the pressure inside the container increases, beyond a pre-determined or threshold value, the pressure is capable of overcoming the compressive stresses causing closure of the orifice, causing orifice 2 to open. The pre-determined threshold value depends on the dimensions of orifice 2 and on the elasticity of the valve material.

For example, the gasses released in the disinfection process occurring inside, and built up in, the lens carrier will be evacuated to the outside. When this release of gasses stops and the differential pressure returns to a value below the opening pressure, orifice 2 closes up again and the container remains hermetically sealed. The liquid inside the container cannot be spilled, even if the container is shaken. The valve shown in FIGS. 1 and 3 is particularly suitable for use in such a container.

The valve as shown in FIG. 4 is particularly applicable to fluid-distribution ducts. The valve is particularly suited for end capping the branching the different ducts in which the interposition of this type of valve facilitates flow regulation so that the quantity of flow may be similar in all the ducts.

The valve can also be used to protect products that alter their characteristics upon contact or exposure to air, e.g., protection from microbial contamination, evaporation, hardening of the product, etc. A small amount of the product can be extracted and metered by exerting an outside pressure on the container, such as squeezing the container walls and thus forcing the product out through the valve. The valve will then re-close completely, preventing contamination, evaporation, etc. of the product that remains in the container.

There are three different embodiments of the valve according to the present invention as shown, respectively, in FIGS. 1, 3 and 4. As can be seen in FIG. 1, the container has a wall 4 containing a recess 8 into which the valve 1 may be placed. The valve has an outer dimension 10, which is more clearly shown in FIG. 2, and the recess 8 has an inner dimension 12. The outer dimension 10 of the valve is slightly larger than the inner dimension 12 of the recess, such that the valve will be held by a compression force fit when the valve is placed into the recess. The container wall 4 has a longitudinal axis 14 having a first axis end 16 and a second axis end 18. The recess 8 has two dimensions with a larger inner dimension 12 at the first axis end 16 and with a smaller inner dimension 20 at the second axis end 18. The valve outer dimension 10 is larger than the recess larger inner dimension 12 and is larger than the recess smaller inner dimension 20, such that the valve is prevented from exiting the recess by the smaller inner dimension 20.

In the second embodiment, as shown in FIG. 3, the valve 1 has an outer wall 22 and the valve further includes a flange 3 having a C-shaped indentation 24 that circumferentially surrounds the outer wall 22 of the valve. The container has a wall 4 with a C-shaped inwardly directed circumferential projection 26 that matingly fits within the flange C-shaped indentation 24. Thus, the valve is firmly held in position in the container wall by the matingly interconnected C-shaped projection 26 within the C-shaped indentation 24.

In the third embodiment, as shown in FIG. 4, the valve 1 has an inner wall 28; and further includes a flange 3. The flange has an L-shaped indentation 30 with a first arm 32 perpendicular to a second arm 34 that circumferentially surrounds the inner wall 28 of the valve. The container has a wall 4 with an L-shaped outwardly directed circumferentially projection 36 that matingly fits within the flange L-shaped indentation 30, with this projection 36 having a first arm 38 perpendicular to a second arm 40. Thus, the valve is firmly held in position around the outside of the container wall by the matingly interconnected L-shaped projection 36 within the L-shaped indentation 30.

The perforation 2 has an axial length 42 as shown in FIG. 2, and the valve has a total length 44; and the perforation has an axial length which is less than the total length of the valve. As can be seen in FIGS. 1, 3 and 4, the valve includes at least one cavity 46 located at the bottom end 48 of the valve body and in communication with the perforation 2, which opens into the top end 50 of the valve body. Cavity 46 acts as a collection chamber into which the fluid to be released may accumulate before being discharged through the transient perforation 2. The embodiment shown in FIG. 3 is for a valve used with a container that is a contact lens container and the valve will release gasses from the container which are created during the lens cleaning and disinfecting process. As shown in FIG. 4, the valve is formed as an outside part around a tubular duct for metering liquids in small doses as part of a branched duct system.

There are various methods for manufacturing the elastic valve of the invention. In one such method, there is a perforation made into the elastic material of the valve, and then the material is compressed into a recess in the container, so that the sides of the perforation remain in contact with each other until the differential threshold pressure between both sides of the valve reaches a pre-determined value.

In another method for manufacturing the elastic valve of the invention, a bore is made into the valve body. An elastic material is injected into the bore, followed by hardening of this material. Then, the perforation is made into the material. This material could be a polymer, either a thermoplastic polymer such as a polyolefin, for example, a polyethylene, or a thermosetting polymer, such as a phenol formaldehyde resin.

The valve according to the invention has several advantages. For example, it is a simple element, easy to manufacture, install and maintain. It operates effectively and offers great security because it can be opened by very small differences in pressure. Thus, the valve guarantees that any excess pressure which may be produced in the container or duct is reduced.

While only several embodiments of the present invention have been shown and described, it is to be understood that many changes and modifications may be made thereunto without departing from the spirit and scope of the invention as defined in the appended claims.

What is claimed is:

1. An elastic valve for controlling the escape of a fluid under a pressure in a container comprising:
   a single piece of elastic material formed as a valve body with a transient perforation that remains closed when the pressure of the fluid is less than a pre-determined value;
   said perforation can be opened due to the elastic nature of the material to release fluid when a differential pressure between the pressure in the container and a pressure outside the container reaches said pre-determined value; and
   wherein the counter has a wall with an interior side and an exterior side and a recess extending from the interior side to the exterior side, the recess having a larger inner dimension adjacent the interior side and a smaller inner dimension adjacent the exterior side, said valve body outer dimension being larger than the recess larger inner dimension and larger than the recess smaller inner dimension, such that said valve body is held in the recess by the smaller inner dimension.

2. The valve according to claim 1, wherein the container has a wall containing a recess into which said valve may be placed,
   said valve having an outer dimension, and said recess having an inner dimension, with said outer dimension slightly larger than said inner dimension such that said valve will be held by a compression force fit when said valve is placed into said recess.

3. The valve according to claim 1, wherein the elastic material is selected from the group consisting of virgin gum, silicon elastomers and synthetic elastomers.

4. The valve according to claim 1, wherein the perforation has an axial length and the valve body has a total length; and wherein the perforation has an axial length less than the total length of the valve body.

5. The valve according to claim 1, further comprising at least one cavity located at the bottom end of said valve body and in communication with the perforation.

6. The valve according to claim 1, wherein the container is a contact lens container, the valve releasing gasses from the container which are created during the lens cleaning and disinfecting process.

* * * * *